United States Patent [19]

Arima

[11] Patent Number: 5,067,280
[45] Date of Patent: Nov. 26, 1991

[54] WEATHER STRIP AND APPARATUS AND PROCESS FOR MANUFACTURING THE SAME

[75] Inventor: Hidetoshi Arima, Obu, Japan

[73] Assignee: Tokai Kogyo Kabushiki Kaisha, Obu, Japan

[21] Appl. No.: 611,940

[22] Filed: Nov. 13, 1990

[30] Foreign Application Priority Data

Nov. 14, 1989 [JP] Japan ................. 1-295616
Nov. 22, 1989 [JP] Japan ................. 1-303756

[51] Int. Cl.$^5$ ................................. E06B 7/16
[52] U.S. Cl. ......................................... 49/498
[58] Field of Search ................. 49/498, 479, 497

[56] References Cited

U.S. PATENT DOCUMENTS

| | | | |
|---|---|---|---|
| 4,067,146 | 1/1978 | Mesnel et al. | 49/498 X |
| 4,374,880 | 2/1983 | Mesnel | 49/498 X |
| 4,531,326 | 7/1985 | Ballocca et al. | 49/497 |
| 4,616,446 | 10/1986 | Okamoto | 49/479 X |
| 4,619,077 | 10/1986 | Azzola et al. | 49/498 X |
| 4,761,917 | 8/1988 | Knecht et al. | 49/498 X |
| 4,769,947 | 9/1988 | Ogawa et al. | 49/479 |
| 4,976,069 | 12/1990 | Arima et al. | 49/479 X |
| 4,977,706 | 12/1990 | Kisanuki | 49/479 |
| 4,979,333 | 12/1990 | Goto et al. | 49/479 |
| 4,998,946 | 3/1991 | Nozaki | 49/497 |

*Primary Examiner*—Rodney M. Lindsey
*Assistant Examiner*—Jerry Redman
*Attorney, Agent, or Firm*—Dennison, Meserole, Pollack & Scheiner

[57] ABSTRACT

A weather strip including a plurality of weather strip portions having different circumferential lengths and being integrally formed as a unit. Such a weather strip is manufactured by molding a starting product of the weather strip and subsequently forming or shaping the starting product. The forming of the starting product is applied on partly or throughout the entire length thereof.

9 Claims, 23 Drawing Sheets

5,067,280

WEATHER STRIP AND APPARATUS AND PROCESS FOR MANUFACTURING THE SAME

BACKGROUND OF THE INVENTION

The present invention relates to a weather strip and apparatus and process for manufacturing the same, and more particularly, the invention relates to an irregular shaped weather strip or a weather strip which includes a plurality of portions having different circumferential length or different cross-sectional configurations and apparatus and process for manufacturing the same.

The door of an automobile is provided with a weather strip to seal a clearance formed between the door and the body so that entry of raindrops and the like is effectively prevented. The clearance formed between the door and the body is not generally uniform; therefore, the door is conventionally provided with a weather strip which includes a plurality of portions having different circumferential length, or different cross-sectional configurations with respect to each other, so that such a clearance is sufficiently sealed to prevent entry of raindrops and the like. In some of weather strips provided on automotive doors, the outer circumferential length of a portion positioned on the frame portion of the door is different from that of a portion positioned on the panel portion of the door. Such a weather strip, when the door is closed, acts as a member to encourage the stabilization of the door and to enhance sealing performance between the door and the body.

A conventional process for manufacturing irregularly shaped weather strip comprises the steps of molding a plurality of weather strip fractions having different circumferential length produced by an extruding procedure, fitting the fractions into bonding dies and bonding the fractions at the ends to produce a weather strip. Thus, since the conventional process for manufacturing the irregularly shaped weather strip includes a step of bonding the weather strip fractions at the ends, the weather strip as produced has a plurality of joining portions.

A problem usually associated with the conventional process is that the produced weather strip exhibits undesirable awkward appearance.

Another problem usually associated with the conventional process is that the produced weather strip tends to be broken at the joining portions.

A further problem usually associated with the conventional process is that a variety of molding dies and bonding dies are required to produce the weather strip, and these dies have to be replaced whenever the design of the weather strip is changed. This may lead to increased working time.

A still further problem usually associated with the conventional process is that the process includes a large number of basic steps to produce the weather strip, thereby causing increased working time and labor cost.

SUMMARY OF THE INVENTION

It is an object of the invention to provide a weather strip which may exhibit a good appearance and has desirable strength.

It is another object of the invention to provide a manufacturing process of the weather strip in which the problem associated with the conventional process is eliminated.

It is a further object of the invention to provide apparatus for manufacturing the weather strip suitable for practicing the process.

According to the present invention, there is provided a weather strip which comprises a plurality of hollow weather strip portions having a cross section of different circumferential or perimeter lengths. The weather strip portions are integrally formed as a unit.

According to the present invention, there is provided a process for manufacturing a weather strip which comprises the steps of extruding a molding material from an extruding opening formed on a molding die, partly cutting off the extruded molding material to form a longitudinal slit thereon after the molding material is extruded from the opening for a length equal to that of one of the weather strip portions having larger circumferential length, and pressing the extruded and slitted molding material to close the slit so that the other weather strip portions having smaller circumferential length are integrally formed with said one of the weather strip portions. To press the extruded and slitted molding material, forming rolls or forming dies can be used.

According to the present invention, there is provided an apparatus for manufacturing a weather strip which comprises a molding die having an opening and a projection projected into the opening, a core member inserted in the opening of the molding die so a to contact the edge of the projection, the core member cooperating with the molding die to form an extruding opening therebetween for molding a starting product of the weather strip having a slit, a first forming roll, a second forming roll, and a cutter to partly cut off the starting product for spreading the width of the slit.

According to the present invention, there is further provided an apparatus for manufacturing a weather strip which comprises a molding die having an opening, a core member inserted in the opening of the molding die, the core member cooperating with the molding die to form an annular extruding opening therebetween for molding a starting member of the weather strip, a first forming die, a second forming die engageable with the first forming die, and a cutter to partly cut off the starting member for forming a slit thereon.

An important feature of the present invention is that the portions of the weather strip are integrally formed as a unit, thereby offering the advantage that the weather strip exhibits a good appearance and has desirable strength.

Another feature of the present invention is that the process includes decreased number of basic steps to produce the weather strip, thereby offering the advantage that the working time is decreased.

A further feature of the present invention is that since the apparatus includes no bonding dies and includes a reduced number of molding dies, the cost of the apparatus is remarkably decreased.

The present invention will become more fully apparent from the claims and the description as it proceeds in connection with the drawings.

DETAILED DESCRIPTION OF THE PREFERRED EMBODIMENT

Referring now to FIGS. 1 to 5, shown therein is a irregularly shaped weather strip S1 according to the present invention which is applicable to a door 1 of an automobile. Further, for convenience in terminology, the irregular shaped weather strip will be called a "weather strip" in the following description.

Figure 2:
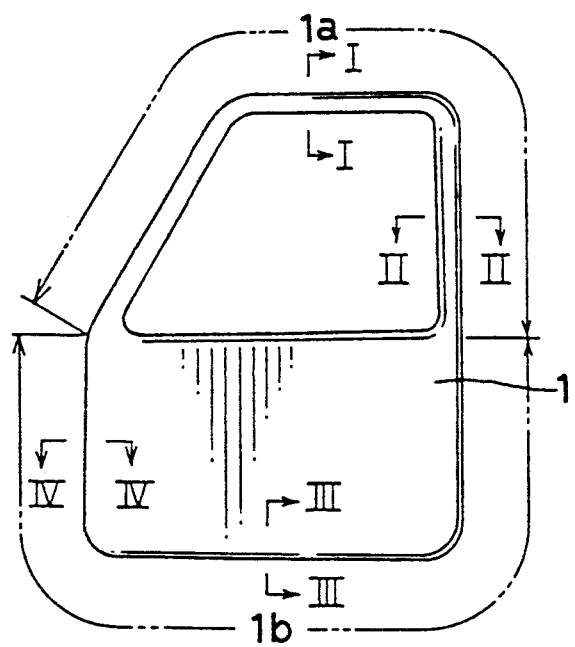
FIG. 2 is a plan view of the door.
Figure 4:
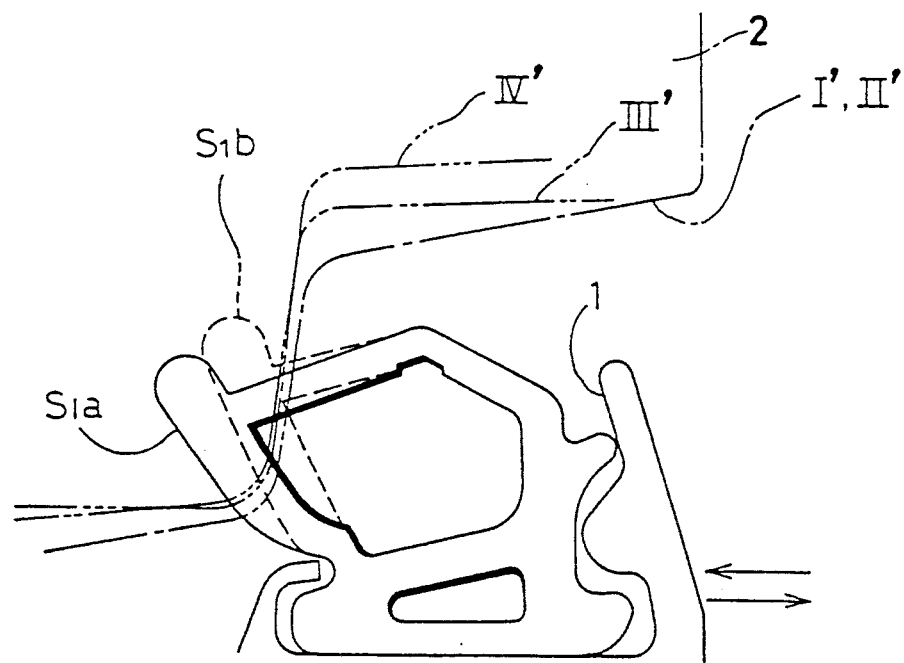
FIG. 4 is a view showing the relation between the door and an opening edge of a body of the automobile.
Figure 5:
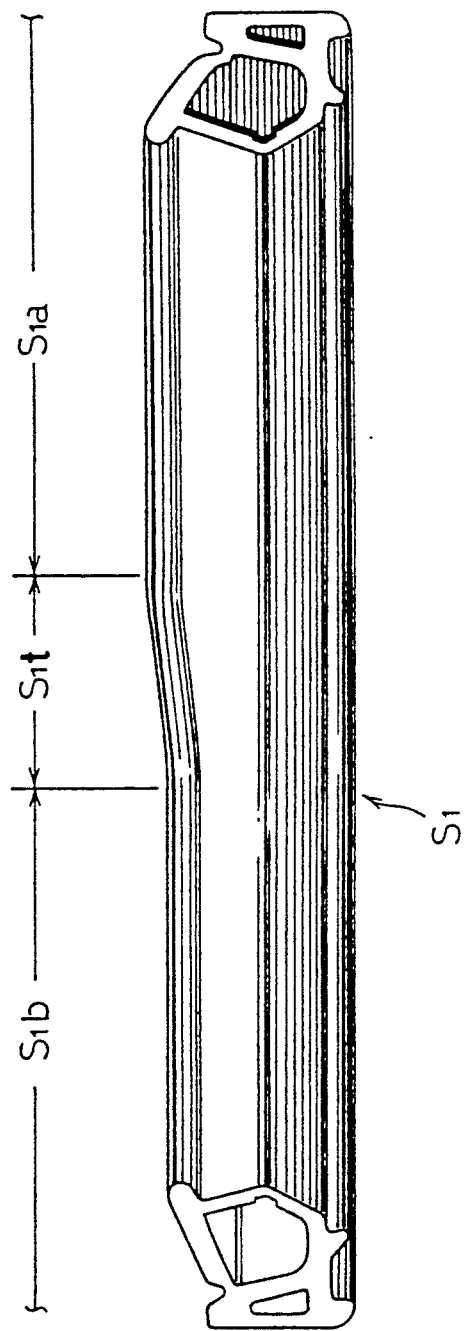
FIG. 5 is a fragmentary perspective view of the weather strip.

In FIG. 4, phantom lines 11', III and IV' correspond to sectional views of a body 2 taken along lines I—I, II—II, III—III and IV—IV in FIG. 2, respectively. As will be observed from FIG. 4, the cross-sectional configuration of an opening edge 2a of the body 2 which faces to a door opening 3 is not generally uniform, that is, the cross sectional configuration of a portion facing to a frame portion 1a of the door 1 is different from that of a portion facing to a panel portion 1b of the door 1.

Figure 1:
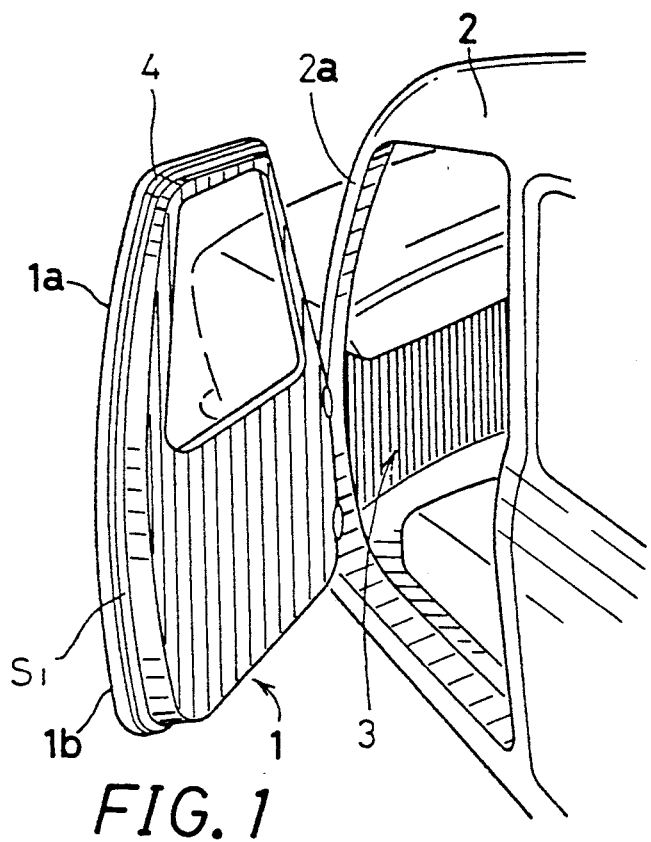
FIG. 1 is a fragmentary perspective view of an automobile of which a door is provided with a weather strip of the present invention.
Figure 3:
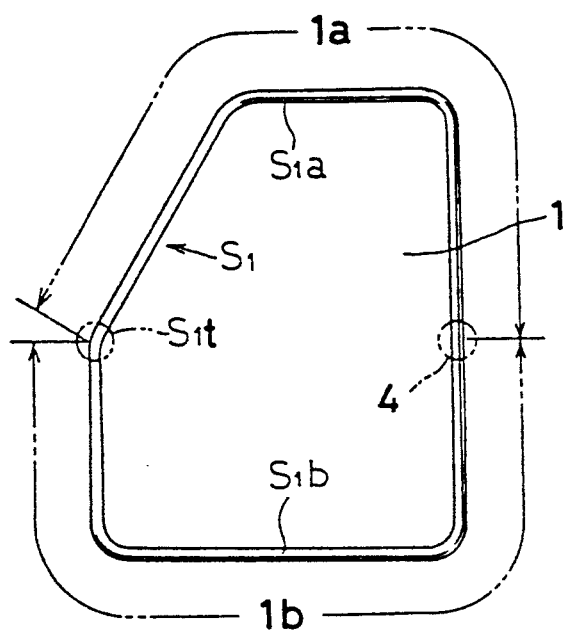
FIG. 3 is an elevational view of the weather strip provided on the door.

As shown in FIGS. 1 and 3, the weather strip S1 is annularly provided on an inner surface of the door 1. The weather strip S1 includes a first portion S1a positioned on the door frame portion 1a and a second portion S1b positioned on the door panel portion 1b. The outer circumferential length or outer configuration of the first and second portions S1a, S1b are sized to effectively seal a clearance formed between the door 1 and the opening edge 2a of the body 2 when the door 1 is closed. The first and second portions S1a, S1b are integrally formed as a unit to form a transitional portion S1t therebetween.

The outer circumferential length of the first portion S1a is of a size sufficiently greater than that of the second portion S1b so that the amount of deformation of the first portion S1a is greater than that of the second portion S1b when the door 1 is closed. With this construction, when the door 1 is closed, the biasing force against the opening edge 2a of the body 2 due to the deformation of the weather strip S1 is increased in the first portion S1a. The different degree of the biasing force allows for enhancement of the stabilization of the door 1 and the sealing performance between the door 1 and the body 2.

The weather strip S1 is an integrally formed member but is bonded at both ends to form a connecting portion 4 when it is provided on the door 1, as shown in FIG. 3.

Referring now to FIGS. 6 to 14, shown therein is apparatus for manufacturing the weather strip S1 according to a first embodiment of the invention.

The apparatus includes a molding die 5. The front end surface 5a of the molding die 5 is formed with an opening 7 into which a projection P having a width W1 is projected (FIGS. 6 to 9). As will be recognized, the opening 7 is configured substantially to the outer configuration of a starting product S1' (FIGS. 6 to 8) as described hereinafter.

Figure 9:
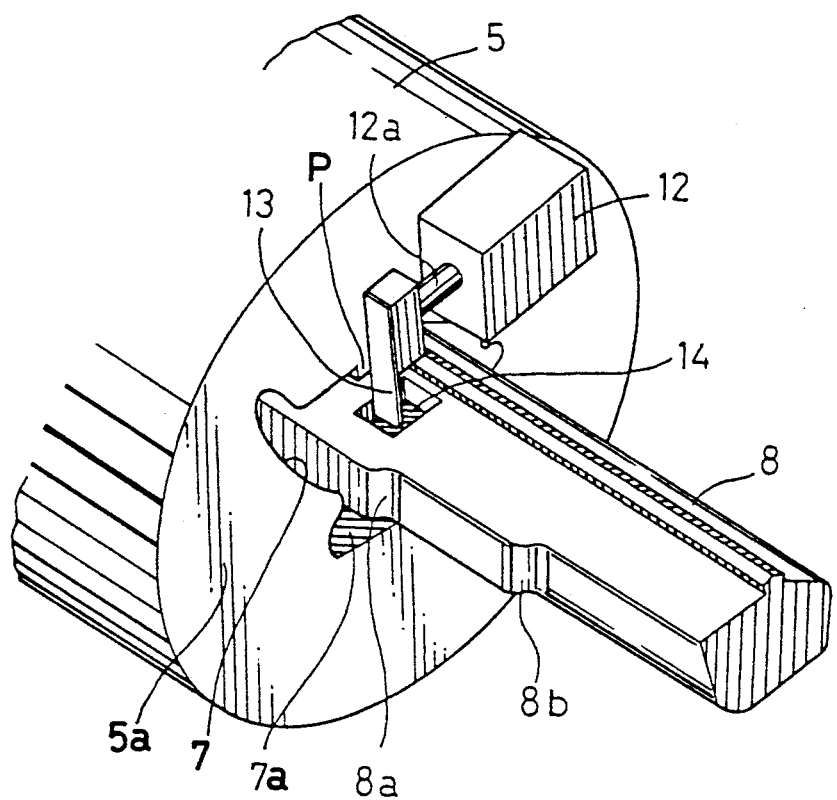
FIG. 9 is a perspective view of the apparatus.

As shown in FIG. 9, the molding die 5 is provided with a core member 8 which is axially inserted into the opening 7 so as to contact the lower edge of the projection P, thereby to provide on the molding die 5 with an extruding opening 7a through which a molding material may be extruded (FIG. 9). The core member 8 is partially projected from the front end surface 5a of the molding die 5 over a desired length. The projected portion of the core member 8 is formed with shoulder portions 8a, 8b at one side surface thereof to forwardly diminish the circumferential length thereof.

Figure 7:
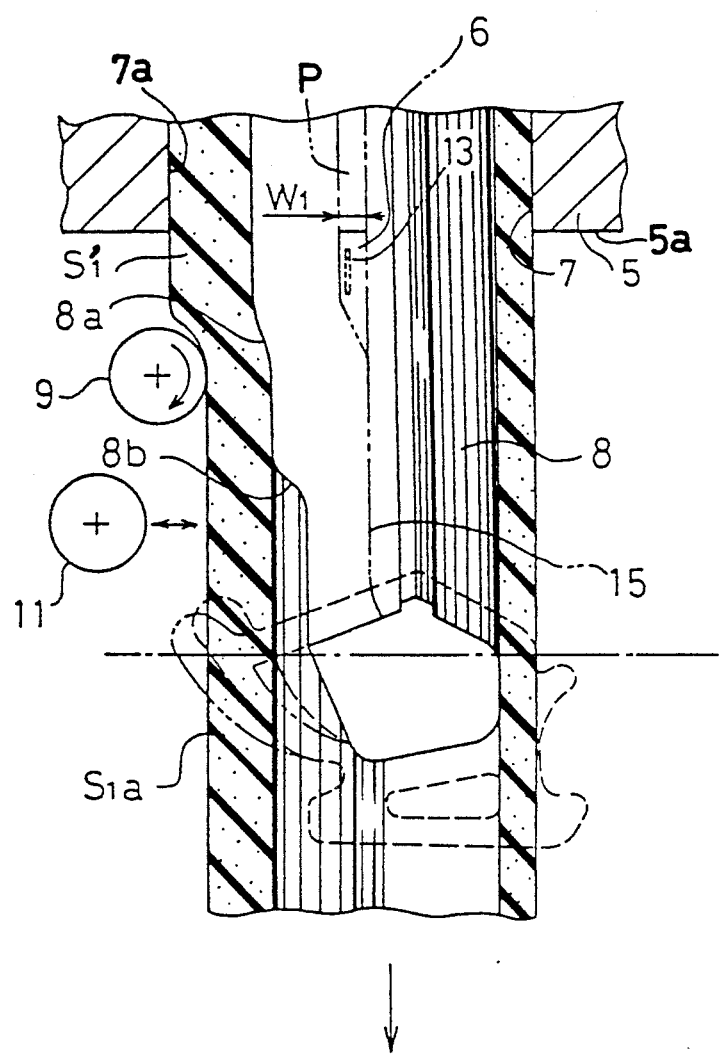
FIG. 7 is a fragmentary sectional view of the apparatus under the condition that a first portion is being formed.
Figure 8:
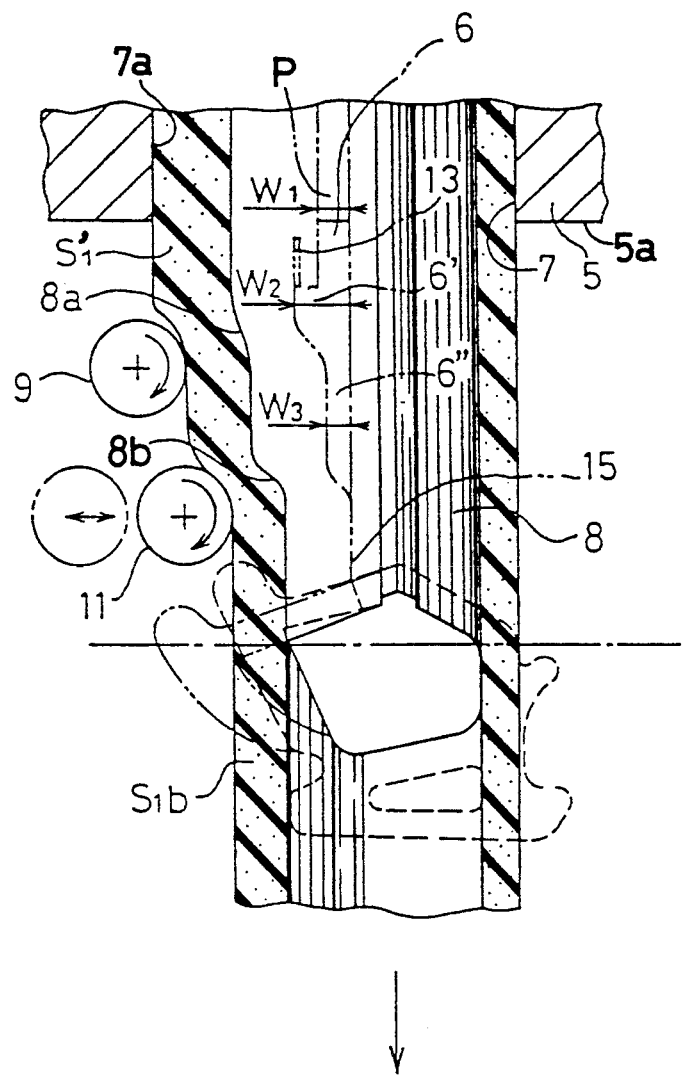
FIG. 8 is a fragmentary sectional view of the apparatus under the condition that a second portion is being formed.
Figure 10:
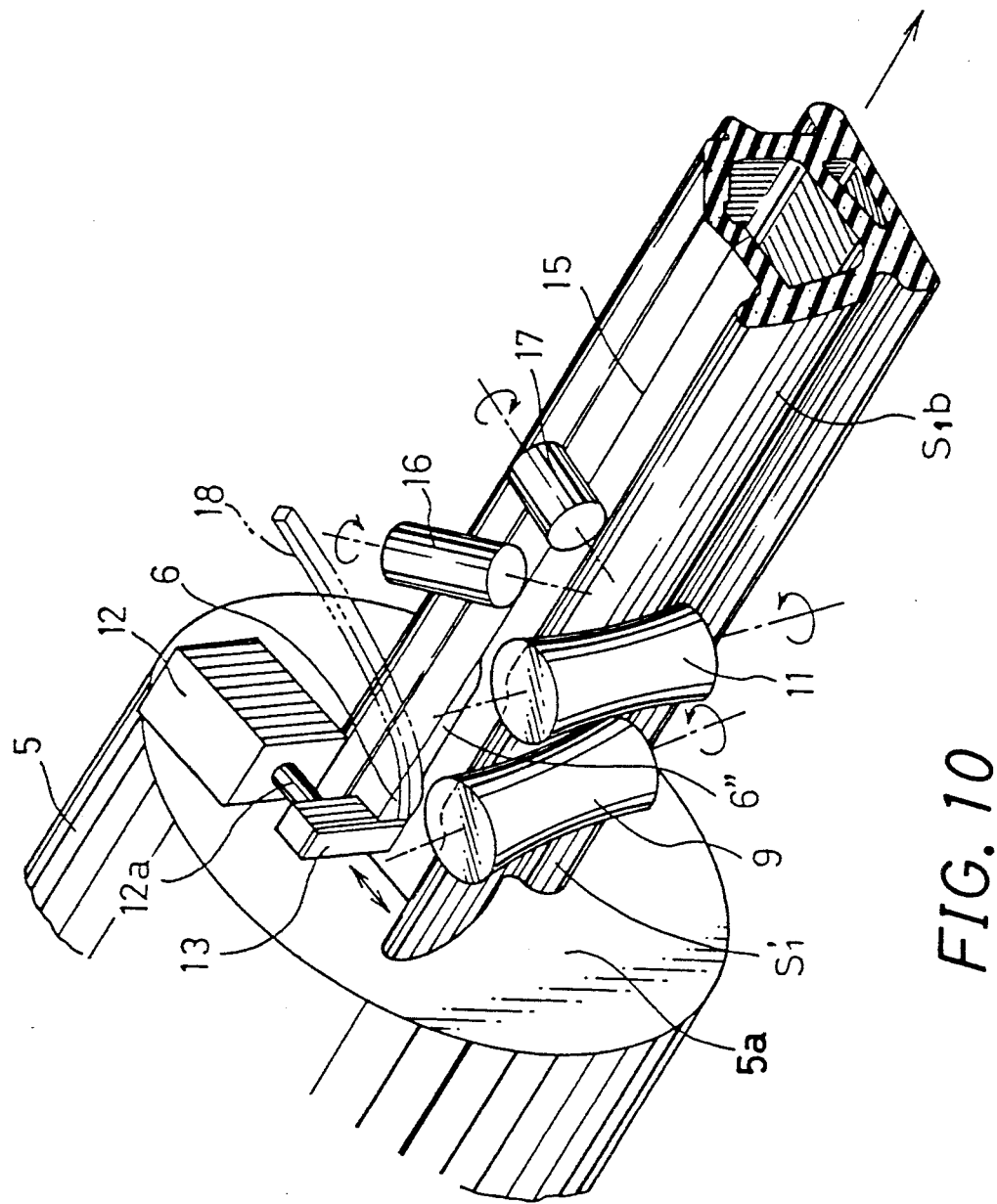
FIG. 10 is a perspective view of the apparatus under the condition that a second portion is being formed.
Figure 13:
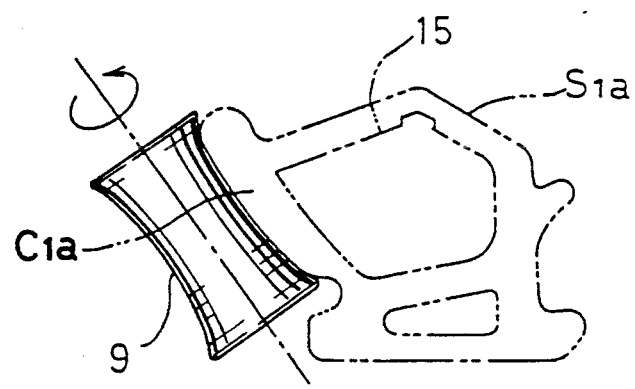
FIGS. 13 and 14 are elevational views of a fixed forming roll and a movable forming roll, respectively.
Figure 14:
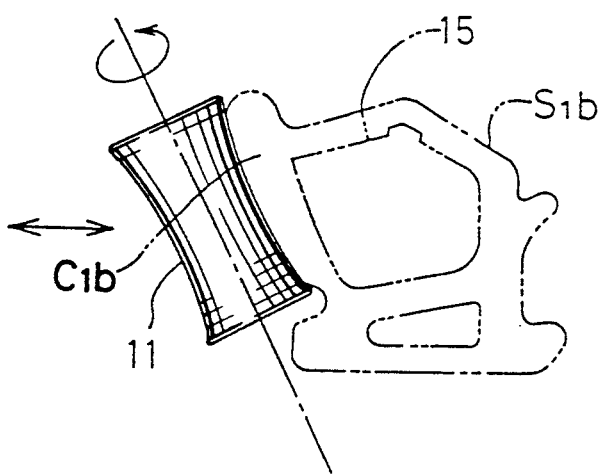

As shown in FIGS. 7, 8 and 10, the apparatus includes a fixed forming roll 9 and a movable forming roll 11 which ar positioned adjacent to the shoulder portions 8a, 8b of the core member 8, respectively. The movable forming roll 11 may be reciprocally moved in the direction perpendicular to the axis of the core member 8. As shown in FIGS. 13 and 14, the fixed forming roll 9 and the movable forming roll 11 are configured to the outer configuration of a portion C1a of the first portion S1a and a portion C1b of the second portion S1b, respectively.

The front end surface 5a of the molding die 5 is provided with a hydraulic cylinder 12 with a rod 12a. The free end of the rod 12a is fixedly provided with a cutter 13. When the cylinder 12 is actuated, the rod 12a is projected to move the cutter 13 in the direction perpendicular to the axis of the core member 8. As shown in FIG. 9, the core member 8 is provided with an opening 14 through which the cuter 13 is vertically inserted, thereby to permit the reciprocal movement of the cutter 13 without interfering with the core member 8.

Figure 6:
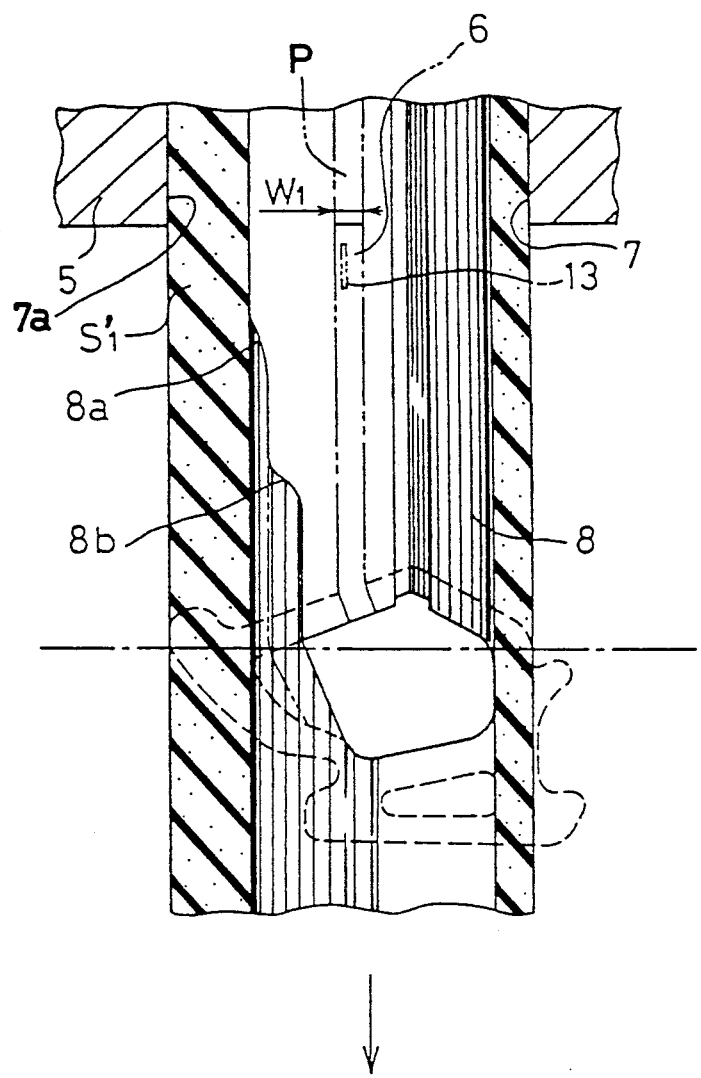
FIG. 6 is a fragmentary sectional view of apparatus according to a first embodiment of the present invention under the condition that a starting product is being molded.

The weather strip S1 is manufactured by the above-described apparatus. As will be appreciated, if the forming rolls 9, 11 are not included in the apparatus, when a molding material is extruded from the extruding opening 7a of the molding die 5, the starting product S1' is formed, as shown in FIG. 6. The starting product S1' is provided with a slit 6 formed longitudinally thereto and having a width of W1. The slit 6 is formed by projection P.

Figure 11:
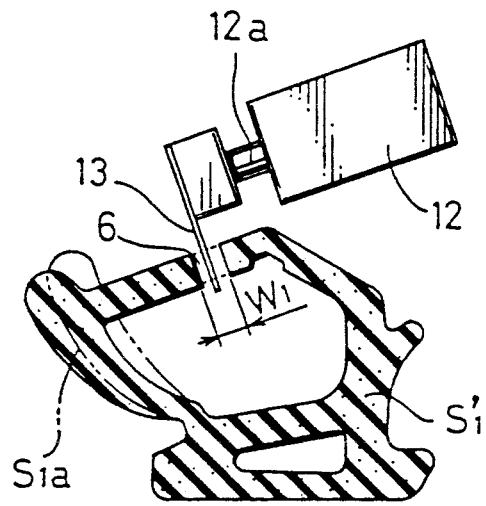
FIG. 11 is a view showing a position of a cutter when the first portion is formed.

In a typical operation to form the weather strip S1, as shown in FIG. 7, the starting product S1' is advanced to pass between the fixed forming roll 9 and the shoulder portion 8a where a side portion of the starting product S1' is shaped by the roll 9 to form the first portion S1a of the weather strip S1. In this step, the movable forming roll 11 is sufficiently apart from the core member 8 so as not to affect the first portion S1a. Also, the rod 12a of the cylinder 12 is retracted to align the cutter 13 to the projection P so that the cutter 13 remains in the slit 6 on the starting product S1' (FIGS. 7, 9 and 11). When the first portion S1a is formed, the slit 6 on the starting product S1' is disappeared to longitudinarily form an abutting portion on the first portion S1a. The abutting portion is simultaneously bonded to form a seam 15 (FIG. 13). This step is continued until the desired length of first portion S1a is obtained.

Figure 12:
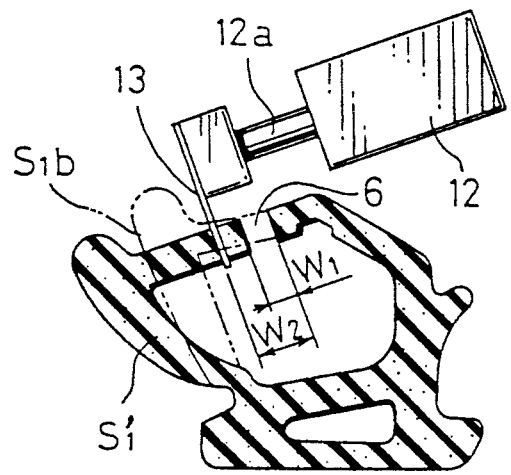
FIG. 12 is a view showing a position of a cutter when the second portion is formed.

After the step for forming the first portion S1a is completed, the movable forming roll 11 is moved to a forming position (FIG. 8) so that a second starting product S1' is shaped to form the second portion S1b. As will be easily understood, before the forming roll 11 is moved to a forming position, the rod 12a of the cylinder 12 is projected to move the cutter 13 (FIGS. 8 and 12). When the starting product S1' is advanced, the cutter 13 partly cut off a thin piece 18 from the staring product S1' to form an enlarged slit 6' having a width W2 greater than the width W1 of the slit 6. The thin piece 18 cut off from the starting product S1' is collected and discarded as waste (FIG. 10). As will be appreciated, the width W2 is substantially equal to the deformation distance of the starting product S1' which is given by the both forming rolls 9, 11.

As shown in FIG. 8, the starting product S1' is advanced to pass between the fixed forming roll 9 and the shoulder portion 8a where a side portion of the starting product S1' is shaped by the roll 9 where the width W2 of the slit 6' is reduced to form an intermediate slit 6" having a width of W3. The starting product S1' is subsequently introduced between the movable forming roll 11 and the shoulder portion 8b of the core member 8 where the side portion of the starting product S1' is further shaped by the roll 11 to form the second portion S1b. When the second portion S1b is formed, the intermediate slit 6" remained on the starting product S1' is disappeared to longitudinarily form an abutting portion on the first portion S1b. The abutting portion is simultaneously bonded to form a seam 15 (FIG. 14). This step is continued until the desired length of second portion S1b is obtained.

The apparatus may also include a conditioning roll 16 which is adapted for conditioning the surface of the area to be bonded, and a planing roll 17 which is positioned downstream of the roll 16 and is adapted for planing the surface of the area. These rolls 16, 17 cooperate to produce the seam 15 having excellent regurality and uniformity.

The preferred embodiment herein described may be modified as follows, for example.

1) A pair of movable forming rolls 11 may be used to form a weather strip which includes three portions having different circumferential length with respect to each other. It is to be understood that in such a case, the core member 8 is provided with three shoulder portions.

2) The cutter 13 may be operated even when the first portion S1a is formed so that the cut off piece 18 is obtained as a continuous piece extending over the entire length of the weather strip S1, thereby to facilitate an operator to handle the cut off piece.

3) The space formed between the rolls 9, 11 and the core member 8 may be smaller than the thickness of the wall of the starting product S1' to enhance the weather strip S1 in quality.

Figure 15:
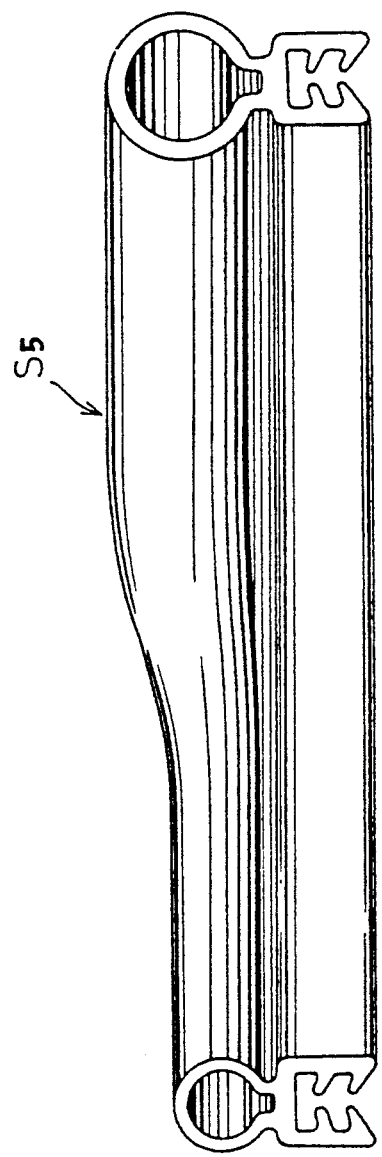
FIG. 15 is a fragmentary perspective view of a weather strip which can be produced by the present invention.

4) As shown in FIG. 15, the weather strip to be formed may be of a configuration as designated by S5. As will be understood, the rolls 9, 11 have to be replaced by the other rolls.

Referring now to FIGS. 16 to 27, shown therein is apparatus for manufacturing the weather strip S1 according to a second embodiment of the invention.

Figure 19:
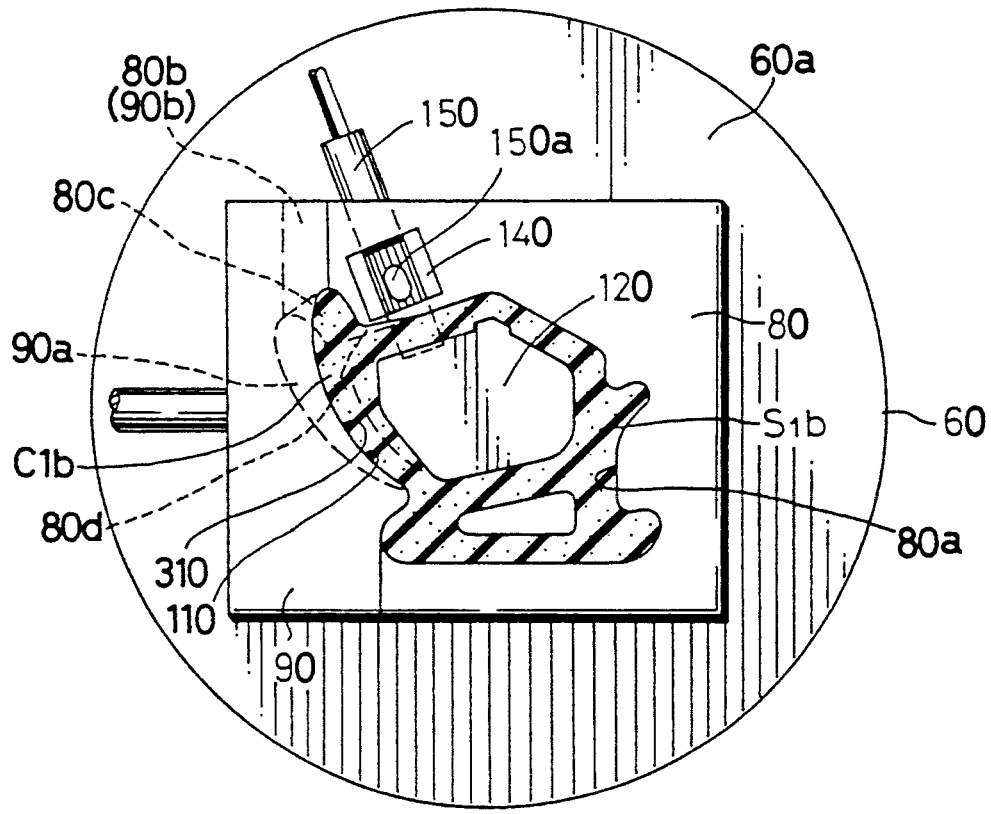
FIG. 19 is an elevational view of the apparatus under the condition that the second portion is being formed.
Figure 20:
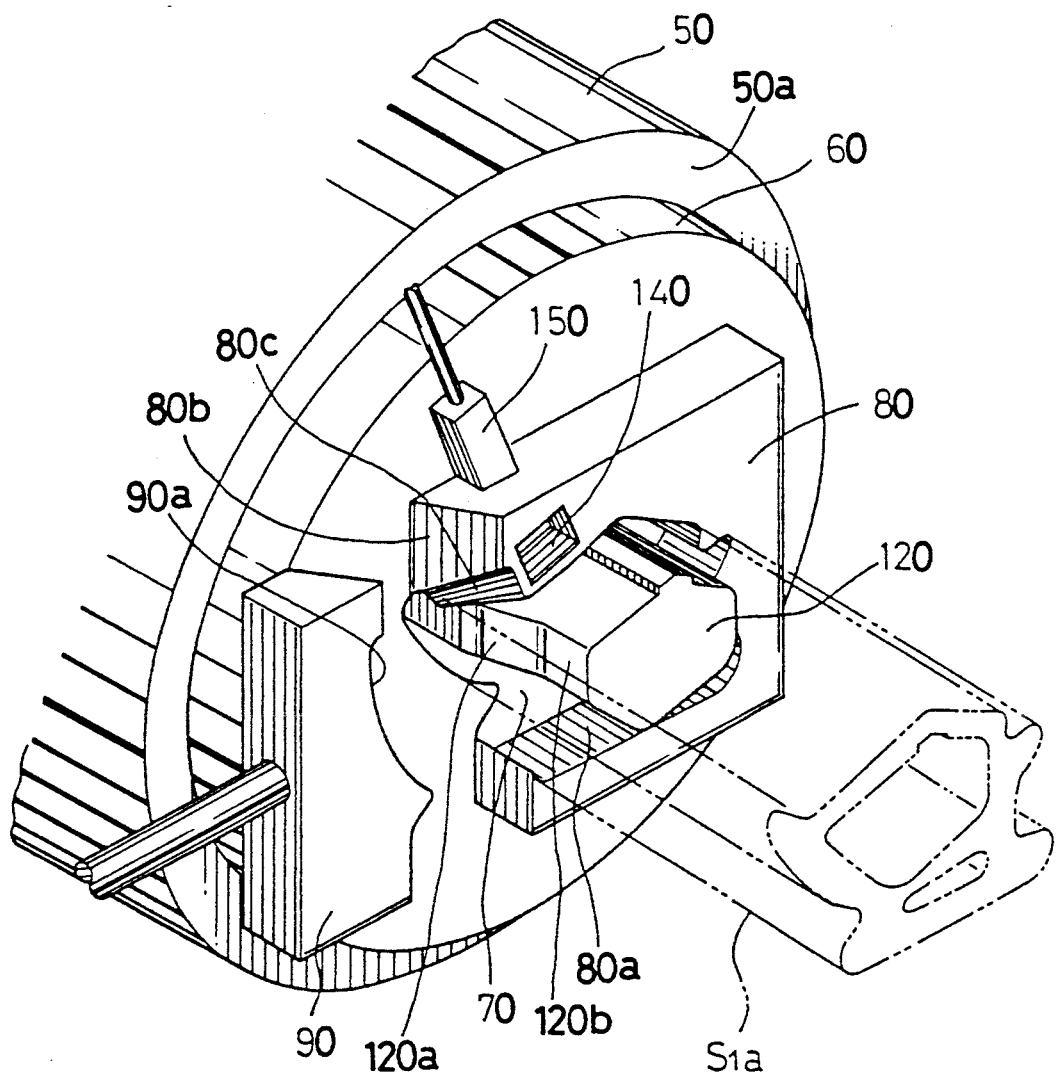
FIG. 20 is a perspective view of FIG. 16.
Figure 21:
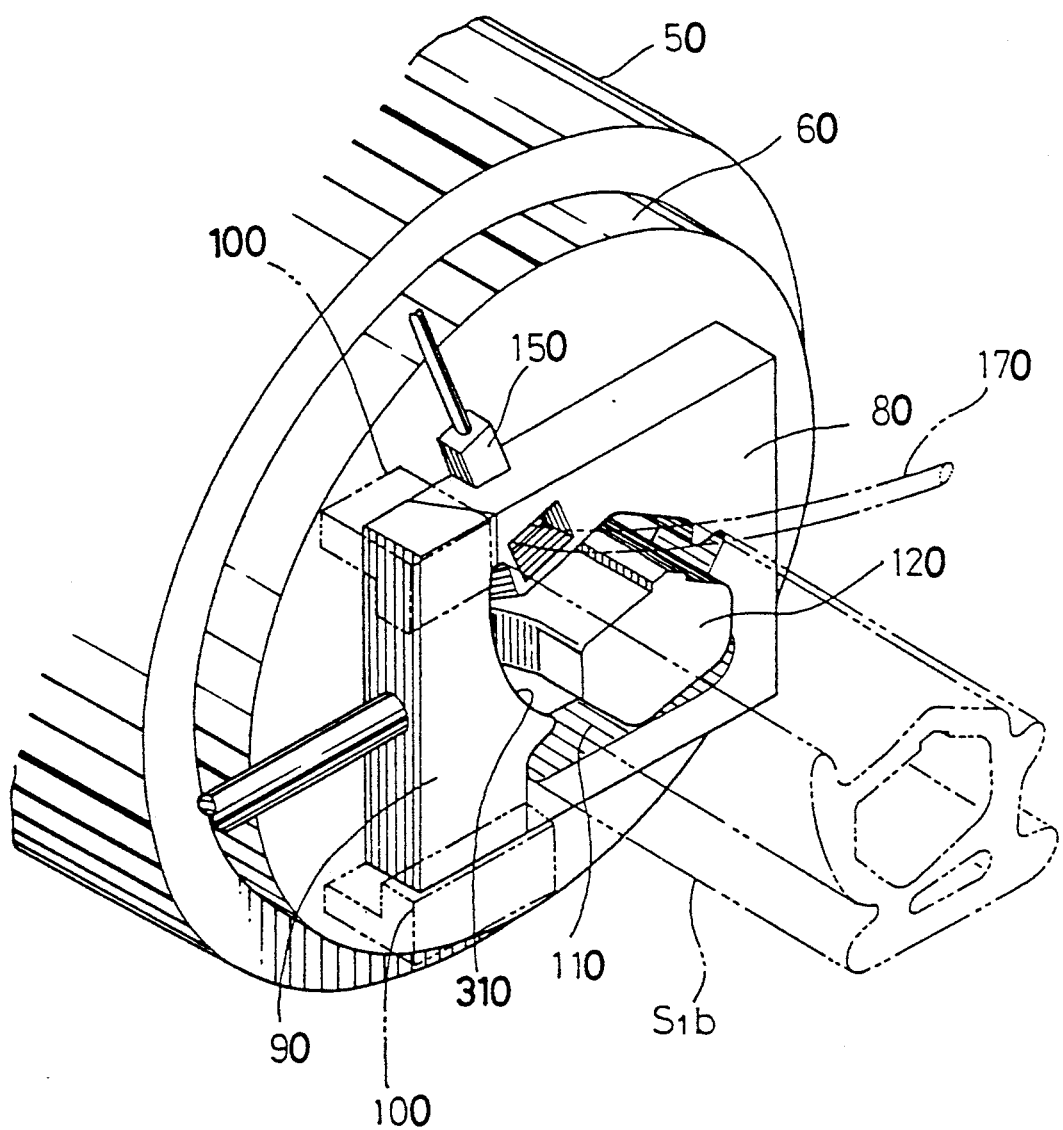
FIG. 21 is a perspective view of FIG. 18.
Figure 22:
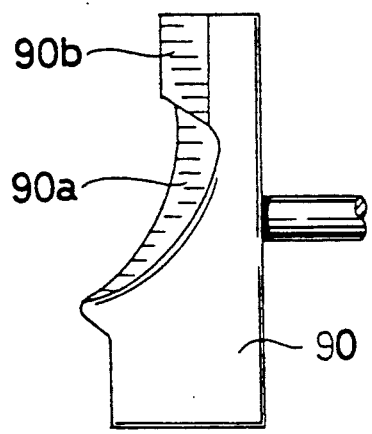
FIG. 22 is a rear elevational view of a movable forming die.

As shown in FIGS. 16 to 23, the apparatus includes a molding die 50 of which the front surface 50a is provided with a circular base plate 60. The front surface 60a of the base plate 60 is formed with an opening 70 which is configured substantially to the outer configuration of the first portion S1a of the weather strip S1. The front surface 60a of the base plate 60 is provided with a fixed forming die 80 and a movable forming die 90 engageable with the die 80. The front face 60a of the base plate 60 is also provided with a guide member 100 to guide the movable forming die 90 (FIG. 21).

The fixed forming die 80 has a notch 80a which is configured to the outer configuration of the first portion S1a excepting the portion C1a at the rear surface of the die 80. Also, the fixed forming die 80 is partly provided with inclined surfaces 80c, 80d so that the notch 80a is configured to the outer configuration of the second portions S1b excepting the portion C1b at the front surface of the die 80 (FIGS. 17, 19, 20 and 23). The movable forming die 90 has a notch 90a comprising of an inclined surface. The notch 90a is configured to the outer configuration of the portion C1a of the first portion S1a at the rear surface of the die 90 and is configured to the outer configuration of the portion C1b of the second portion S1b at the front surface of the die 90 (FIGS. 17, 19, 20 and 22). As will be understood, the fixed and movable forming dies 80 90 have inclined upper abutting surfaces 80b, 90b, respectively. Therefore, when the fixed and movable forming die 80, 90 are completely engaged with each other, an opening 310 is formed therebetween (FIG. 19). The opening 310 is configured to the outer configuration of the first portion S1a at the rear surface of the engaged dies 80, 90 and is configured to the outer configuration of the second portion S1b at the front surface of the engaged dies 80, 90.

Figure 16:
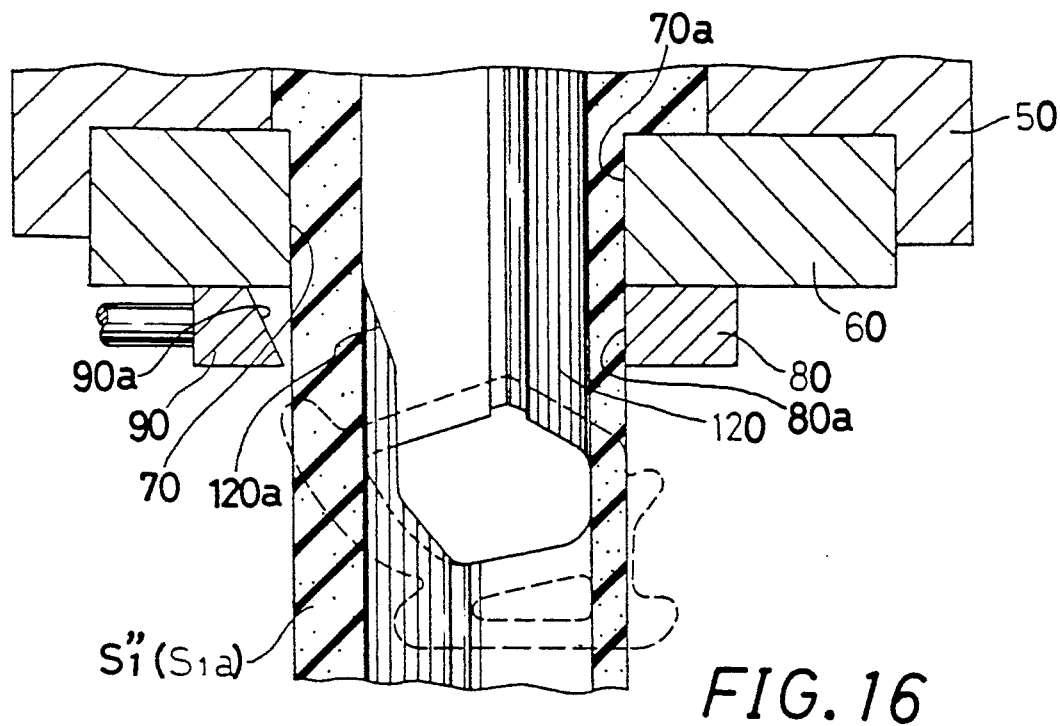
FIG. 16 is a fragmentary sectional view of apparatus according to a second embodiment of the present invention under the condition that the starting product or the first portion is being molded.
Figure 18:
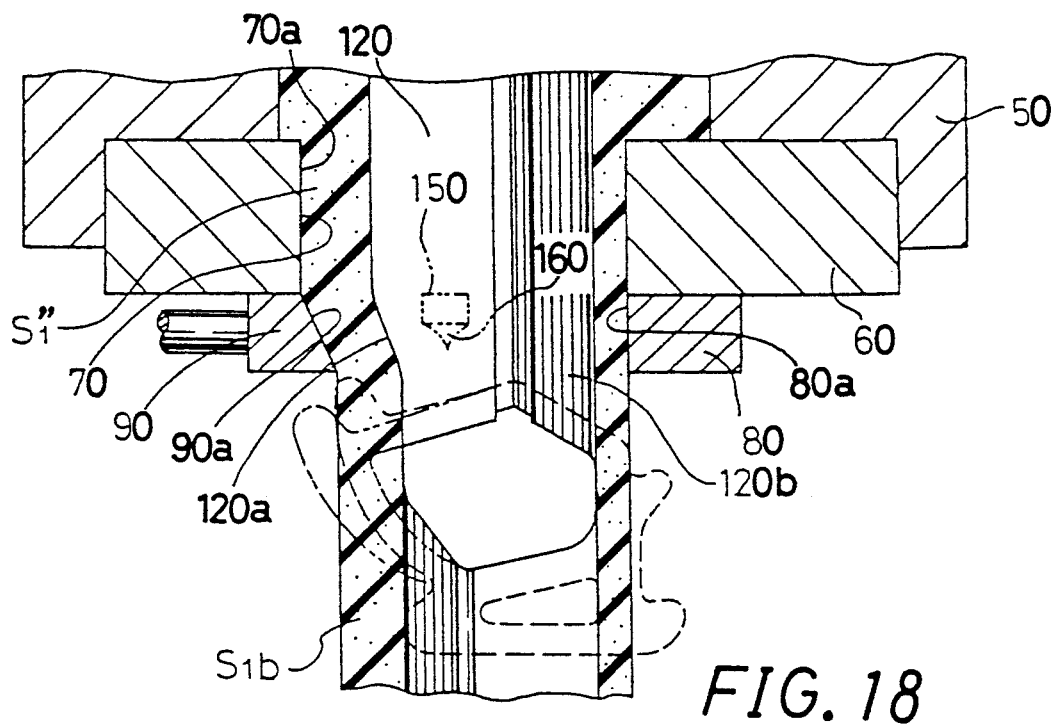
FIG. 18 is a fragmentary sectional view of the apparatus under the condition that a second portion is being formed.

As shown in FIGS. 16 and 18, the molding die 50 is provided with a core member 120 which is axially inserted into the opening 70, thereby to provide the base plate 60 with an annular extruding opening 70a through which a molding material is extruded to form a starting product S1". The core member 120 has an outer configuration identical with the inner configuration of the first portion S1a of the weather strip S1 so that the configuration of the extruding opening 70a is identical with the cross sectional configuration of the first portion S1a. The core member 120 passes through between the notches 80a, 90a of the dies 80, 90 and partially projects from the front surface of the dies 80, 90. The core member 120 is provided with a shoulder portion 120a at one side surface thereof to diminish the circumferential length thereof for forming a diminished portion 120b which has an outer configuration identical with an inner configuration of the second portion S1b of the weather strip S1. Also, the shoulder portion 120a is positioned in alignment with the notches 80a, 90a and is inclined so as to substantially be parallel to the wall surface of the notch 90a. Therefore, when the fixed and movable forming dies 80, 90 are completely engaged with each other, the dies 80. 90 cooperate with the core member 120 to form a forming opening 110 therebetween. As will be recognized, the forming opening 110 has a configuration identical with the cross sectional configuration of the first portion S1a at the rear surface of the engaged dies 80, 90 and has a configuration identical with the cross sectional configuration of the second portion S1b at the front surface of the engaged dies 80, 90.

Figure 23:
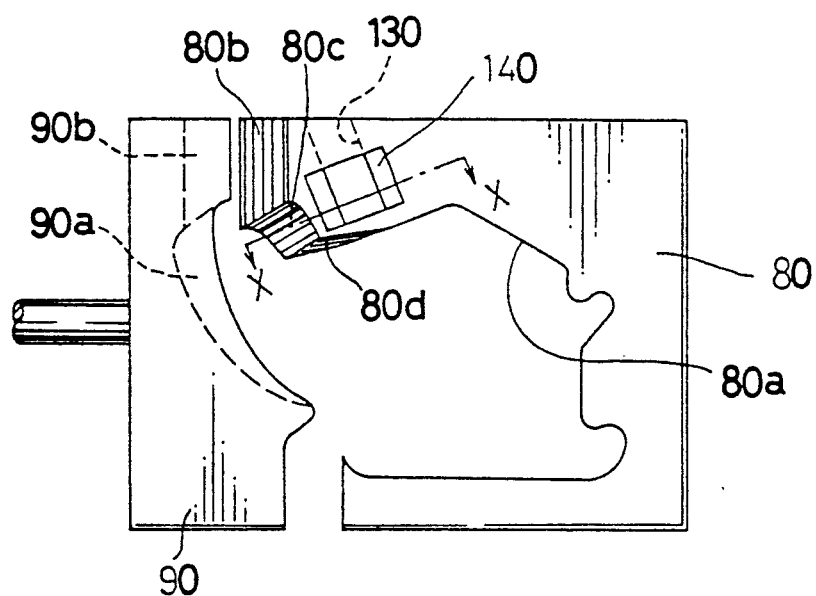
FIG. 23 is a front elevational view of a fixed and a movable forming die.
Figure 24:
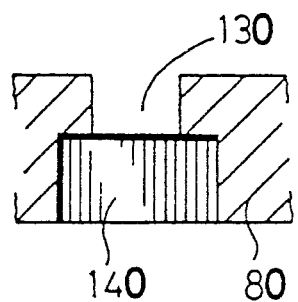
FIG. 24 is a sectional view taken along lines X—X of FIG. 23.

As shown in FIGS. 23 and 24, the fixed forming die 80 is provided with a vertical groove 130 which extends from the upper surface of the die 80 into the notch 80a of the die 80. Also, the forming die 80 is formed with an aperture 140 which communicates with the groove 130 and opens in the front surface of the die 80. A cutter 150 is slidably received in the vertical groove 130, having a discharging aperture 150a from which a cut off piece (described hereinafter) is discharged.

The weather strip S1 is manufactured by the above described apparatus.

Figure 17:
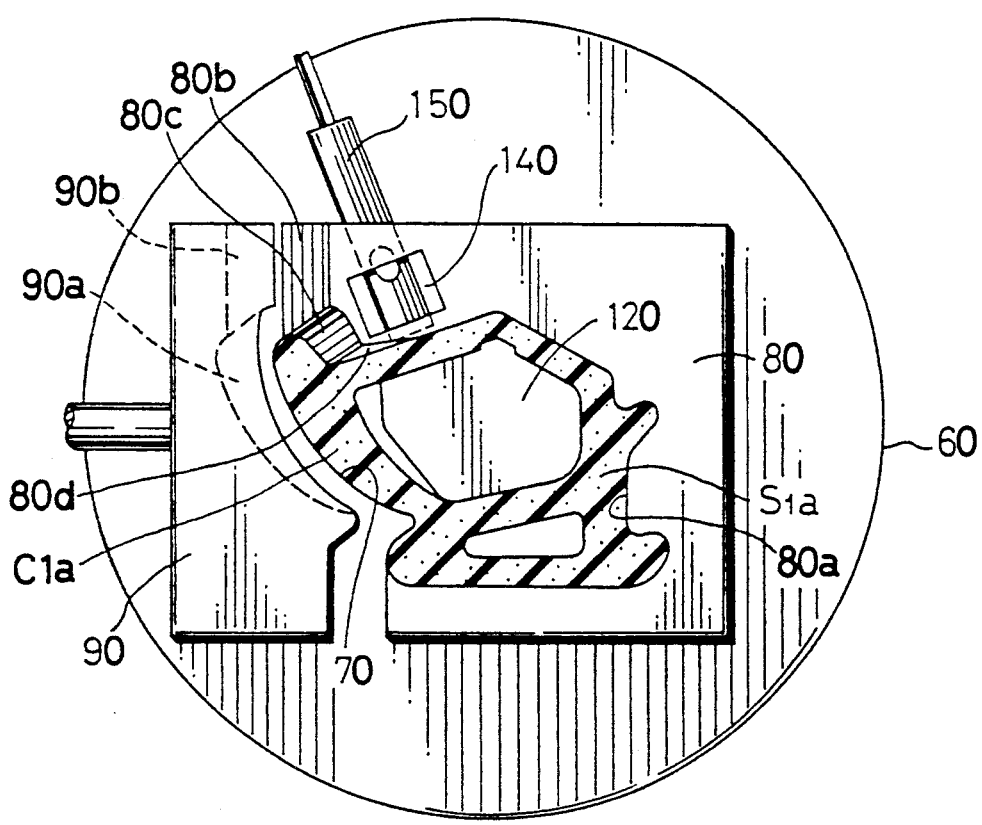
FIG. 17 is an elevational view of the apparatus under the condition that the starting product or the first portion is being molded.

As shown in FIGS. 16, 17 and 20, under the condition that the movable molding die 90 is apart from the fixed molding die 80 and that the cutter 150 is upwardly shifted so as not to project into the notch 80a, a molding material is extruded from the extruding opening 70a formed between the opening 70 of the base plate 60 and the core member 120 where the starting product S1" is continuously formed. As will be easily understood, the cross sectional configuration of the starting product S1" is identical with that of the first portion S1a of the weather strip S1. Therefore, the starting product S1" is used as the first portion S1a of the weather strip S1 without applying any forming procedure. Thus, the first portion S1a may be formed only through an extruding operation. This step is continued until the desired length of first portion S1a is obtained.

Figure 25:
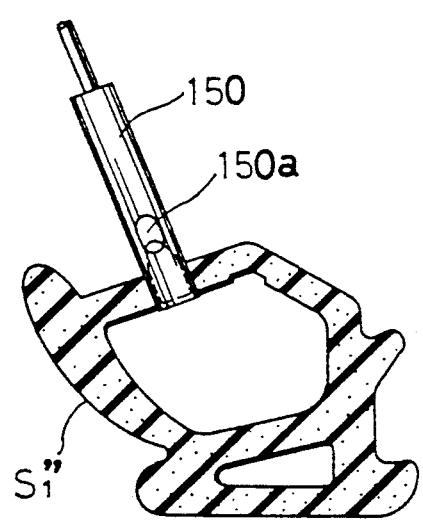
FIG. 25 is a sectional view of the weather strip into which a cutter is penetrated.

After the desired length of first portion S1a is formed, the movable forming die 90 is moved to be engaged with the fixed forming die 80 so that the starting product S1" following to the first portion S1a is shaped to form the second portion S1b (FIGS. 18, 19 and 21). As will be easily understood, before the movable forming die 90 is engaged with the fixed forming die 80, the cutter 150 is downwardly shifted so that the end portion of the cutter 150 is projected into the notch 80a (FIGS. 19 and 25).

Figure 26:
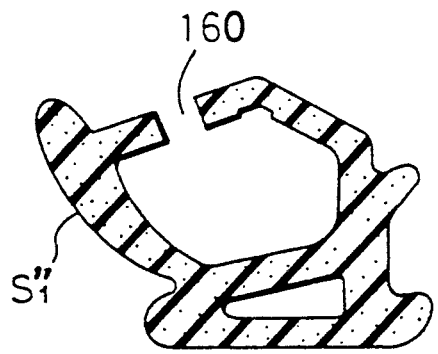
FIG. 26 is a sectional view of the weather strip on which a slit is formed.
Figure 27:
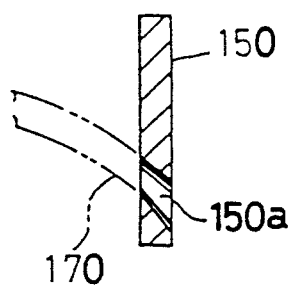
FIG. 27 is a sectional view of the cutter.

When the starting product S1" extruded from the extruding opening 70a is advanced, the cutter 150 may partly cut off a thin piece 170 from the starting product S1" to longitudinary form a slit 160 on the starting product S1" (FIG. 26). The thin piece 170 cut off from the starting product S1" is discharged from the aperture 150a and the discharging aperture 140 (FIGS. 21 and 27). As will be appreciated, the width of the slit 160 is substantially identical with the deformation distance of the starting product S1" which is given by the forming die 90.

As shown in FIG. 18, the starting product S1" formed with the slit 160 is advanced to pass the forming opening 110 formed between the notches 80a, 90a of the forming dies 80, 90 and the core member 120. When the starting product S1" is passed through the forming opening 110, the side portion of the starting product S1" is shaped. Thus, the second portion S1b is effectively formed because the forming opening 110 is configured as above. When the second portion S1b is formed, the slit 160 on the starting product S1" is disappeared to longitudinary form an abutting portion on the formed first portion S1b. The abutting portion is simultaneously bonded to form a seam (not shown). This step is continued until the desired length of second portion S1b is obtained.

Some embodiments modified from the second embodiment will now be described with reference to FIGS. 28 to 37, wherein only parts different from those shown in FIGS. 16 to 27 will be explained.

FIGS. 28 to 33 shows a third embodiment modified from the second embodiment. Apparatus and process of the third embodiment may produce a weather strip S2 including a first portion S2a (FIG. 29), a second portion S2b (FIG. 31) and a third portion S2c (FIG. 33) which have different outer circumferential length and cross sectional configurations relative to each other. As will be appreciated from FIGS. 29 and 31, in such a weather strip S2, the circumferential length of the second portion S2b is considerably shorter than that of the first portion S2a.

Figure 28:
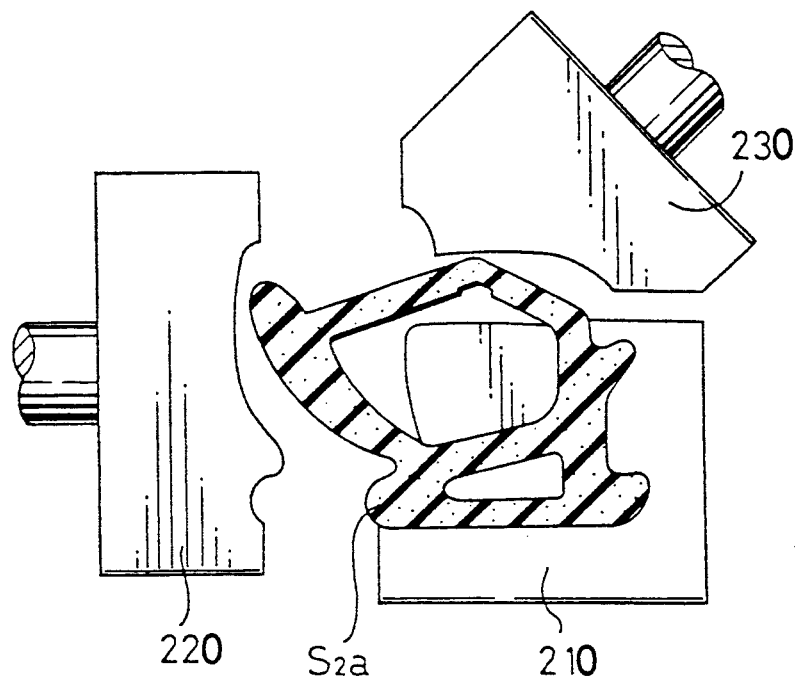
FIG. 28 is an elevational view of apparatus according to a third embodiment of the present invention under the condition that a first portion of another weather strip is being molded.
Figure 29:
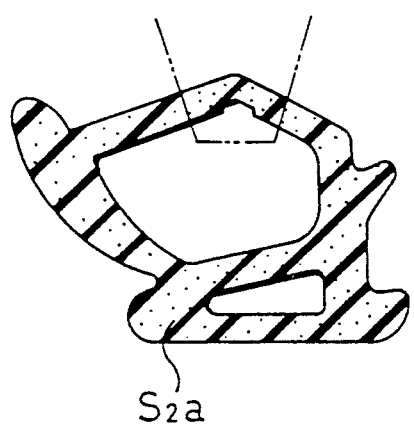
FIG. 29 is a sectional view of the first portion of the weather strip.
Figure 30:
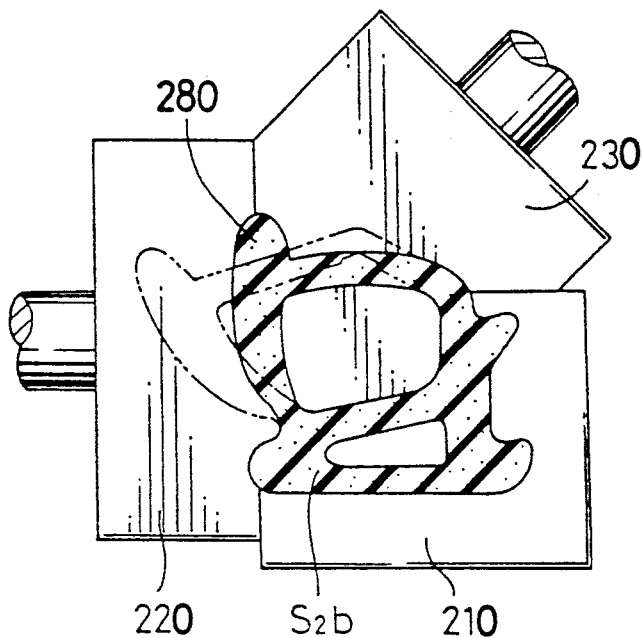
FIG. 30 is an elevational view of the apparatus under the condition that a second portion of the weather strip is being formed.
Figure 31:
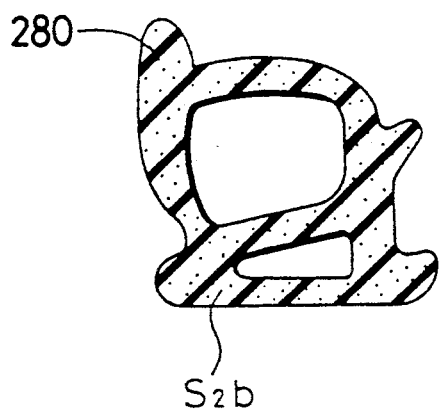
FIG. 31 is a sectional view of the second portion of the weather strip.
Figure 32:
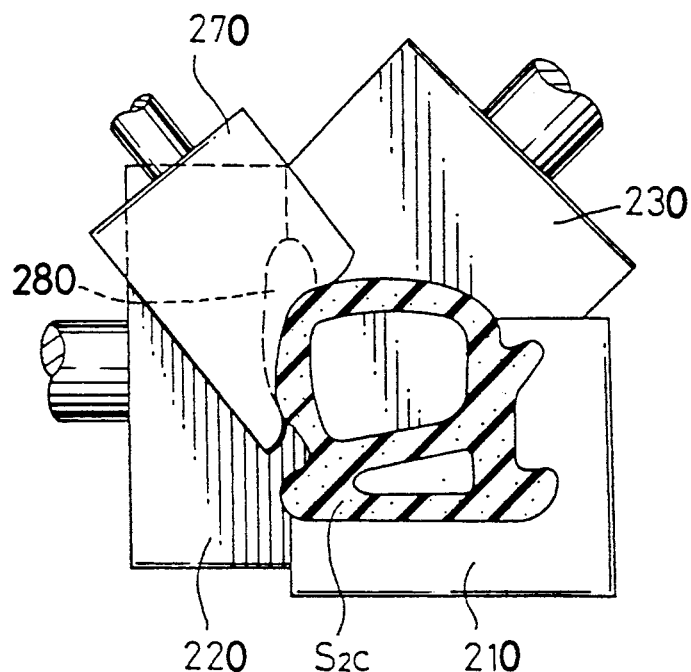
FIG. 32 is an elevational view of the apparatus under the condition that a third portion of the weather strip is being formed.

As shown in FIGS. 28, 30 and 32, the apparatus includes a fixed forming die 210 and a pair of movable forming dies 220, 230 and also includes a movable cutting die 270.

Figure 33:
FIG. 33 is a sectional view of the third portion of the weather strip.
Figure 34:
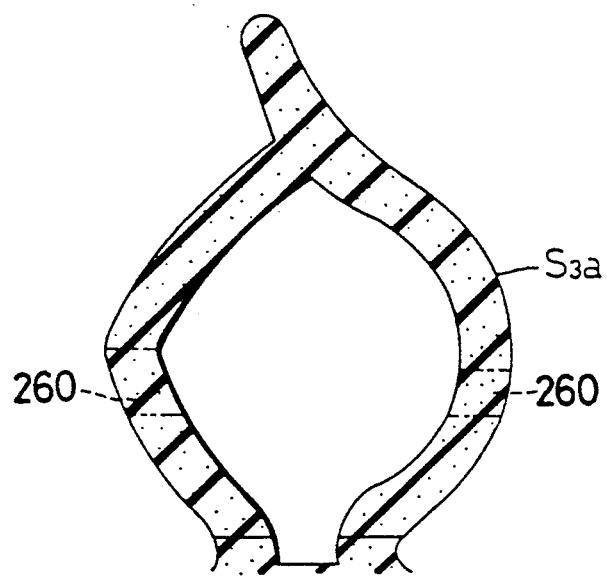
FIG. 34 is a sectional view of a first portion of still another weather strip which can be produced by the present invention.
Figure 35:
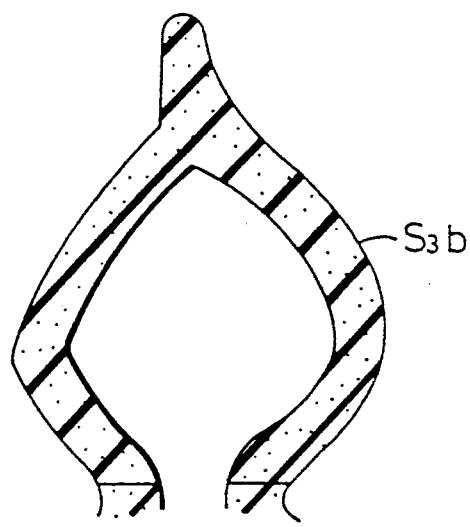
FIG. 35 is a sectional view of a second portion of the weather strip.
Figure 36:
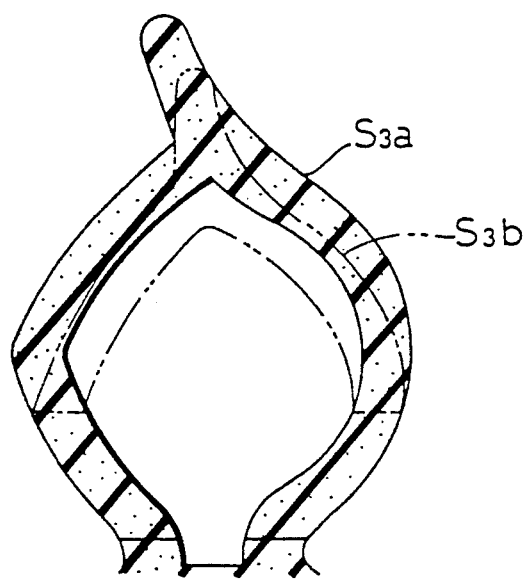
FIG. 36 is a view showing the difference between the configurations of the first and second portions of the weather strip.
Figure 37:
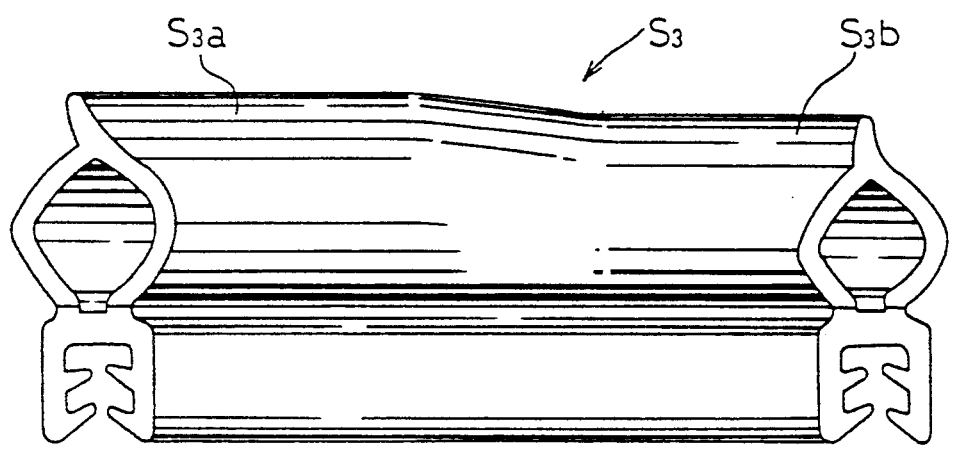
FIG. 37 is a perspective view of the weather strip.

In a typical operation to form the weather strip S2, under the condition that the movable forming dies 220, 230 and the movable cutting die 270 are apart from the fixed forming die 210, a molding material is extruded to form the first portion S2a of the weather strip S2 (FIG. 28). After the desired length of first portion S2a is formed, the movable forming dies 220, 230 are moved to be engaged with the fixed forming die 210 for forming the second portion S2b of the weather strip S2 (FIG. 30). Subsequently, the movable cutting die 270 is moved to a desired position to cut off a part of the weather strip (corresponding to a projecting portion 280 of the second portion S2b), thereby to form the third portion S2c of the weather strip S2 (FIG. 33).

FIGS. 34 to 37 shows a fourth embodiment modified from the second embodiment. Apparatus and process of the fourth embodiment may produce a weather strip S3 including a first portion S3a and a second portion S3b. In producing procedure of the weather strip S3, a pair of slits 260 are formed on the extruded member (not shown) following to the second portion S2a before forming the second portion S3b. As will be easily understood, the apparatus includes a pair of cutters (not shown) to form the slits 260.

The preferred embodiments herein described are intended to be illustrative of the invention and not to limit the invention to the precise form herein described. They are chosen and described to explain the principles of the invention and their application and practical use to enable others skilled in the art to practice the invention.

What is claimed is:

1. A weather strip for use on an automotive door to seal a clearance formed between the door and an opening edge of a body when the door is closed, comprising a first weather strip portion and a second weather strip portion which are integrally formed as a unit, the outer circumferential length of said second weather strip portion being less than the outer circumferential length of said first weather strip portion, the inner circumferential length of said second weather strip portion being also less than the inner circumferential length of said first weather strip portion so that the thickness of said second weather strip portion is substantially identical with the thickness of said first weather strip portion, the reduction in the outer and inner circumferential length being achieved during extrusion of the weather strip.

2. The weather strip as defined in claim 1 further comprising a third weather strip portion which is integrally formed with said second weather strip portion, the outer circumferential length of said third weather strip portion being less than the outer circumferential length of said second weather strip portion, the inner circumferential length of said third weather strip portion being also less than the inner circumferential length of said second weather strip portion so that the thickness of said third weather strip portion is substantially identical with the thickness of said second weather strip portion, the reduction in the outer and inner circumferential length being achieved during extrusion of the weather strip.

3. The weather strip as defined in claim 1 or 2, wherein said adjacent weather strip portions are connected through a connecting portion of which the outer and inner circumferential lengths are gradually changed.

4. In a weather strip for attachment to an automobile door to seal a perimeter opening in an automobile body wherein the clearance space between the door and perimeter opening varies in a plurality of different perimeter zones, said weather strip comprising an integral, hollow, resilient, weather strip member interfaced between said door and said perimeter opening, said weather strip member having a first weather strip portion with a first cross sectional area, a first circumferential outer length defining the perimeter of said first cross sectional area, a first inner circumferential length defining the circumferential perimeter of the hollow portion of said first cross sectional area, said first weather strip portion being interfaced with one of said different perimeter zones; and at least a second weather strip portion with a second cross sectional area, a second circumferential outer length defining the perimeter of said second cross sectional area, a second inner circumferential length defining the circumferential perimeter of the hollow portion of said second cross sectional area, said second weather strip portion being interfaced with another of said different perimeter zones, said second cross sectional area, said second outer circumferential length and said second inner circumferential length all being different from said equivalent dimensional parameters of said first weather strip portion.

5. The weather strip as defined in claim 4 wherein the cross sectional area, the outer circumferential length and the inner circumferential length of said second weather strip portion are less than the equivalent parameters of said first weather strip portion.

6. The weather strip as defined in claim 4 wherein the wall thicknesses of said first and second portions of said weather strip member surrounding the hollow portions are substantially uniform.

7. The weather strip as defined in claim 4 including more than two weather strip portions each with differing cross sectional areas.

8. The weather strip as defined in claim 7 wherein the weather strip portions of differing cross sectional areas are joined in a smooth integral tapering transition.

9. The weather strip as defined in claim 4 wherein the first and second portions of said weather strip member are interfaced with selected perimeter zones to optimize door closing pressure and sealing effectiveness.

* * * * *